US009159228B2

(12) United States Patent
Wang et al.

(10) Patent No.: US 9,159,228 B2
(45) Date of Patent: Oct. 13, 2015

(54) SYSTEM AND METHOD FOR ESTIMATION OF AVAILABLE PARKING SPACE THROUGH INTERSECTION TRAFFIC COUNTING

(71) Applicant: XEROX CORPORATION, Norwalk, CT (US)

(72) Inventors: Yao Rong Wang, Webster, NY (US); Zhigang Fan, Webster, NY (US); Robert P. Loce, Webster, NY (US); Orhan Bulan, Rochester, NY (US); Norman W. Zeck, Ontario, NY (US); Graham Pennington, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 144 days.

(21) Appl. No.: 13/684,817

(22) Filed: Nov. 26, 2012

(65) Prior Publication Data

US 2014/0145862 A1 May 29, 2014

(51) Int. Cl.
*B60Q 1/48* (2006.01)
*G08G 1/04* (2006.01)
*G08G 1/14* (2006.01)
*G08G 1/065* (2006.01)

(52) U.S. Cl.
CPC .................. *G08G 1/04* (2013.01); *G08G 1/065* (2013.01); *G08G 1/141* (2013.01); *G08G 1/142* (2013.01); *G08G 1/147* (2013.01)

(58) Field of Classification Search
CPC ..... G08G 1/141; G08G 30/0284; G08G 1/04; G08G 1/065; G08G 1/142; G08G 1/147
USPC ........................................ 340/932.2; 705/418
See application file for complete search history.

(56) References Cited

U.S. PATENT DOCUMENTS

| | | | | |
|---|---|---|---|---|
| 6,285,297 | B1 | 9/2001 | Ball | |
| 7,956,769 | B1 * | 6/2011 | Pearl | 340/932.2 |
| 2006/0197683 | A1 * | 9/2006 | Hammett | 340/908 |
| 2012/0092192 | A1 * | 4/2012 | Wong | 340/932.2 |
| 2012/0284209 | A1 * | 11/2012 | Duffy et al. | 705/418 |

OTHER PUBLICATIONS

Bernal et al., "Video-Based Detector and Notifier for Short-Term Parking Violation Enforcement", U.S. Appl. No. 13/441,294, filed Apr. 6, 2012.

Fan et al., "Smarphone Augmented Video-Based On-Street Parking Management System", U.S. Appl. No. 13/461,161, filed May 1, 2012.

Wang et al., "A System and Method for Street-Parking-Vehicle Identification Through License Plate Capturing", U.S. Appl. No. 13/461,191, filed May 1, 2012.

(Continued)

*Primary Examiner* — Hai Phan
*Assistant Examiner* — Zhen Y Wu
(74) *Attorney, Agent, or Firm* — MH2 Technology Law Group LLP

(57) ABSTRACT

A method and structure for estimating parking occupancy within an area of interest can include the use of at least two image capture devices and a processor (e.g., a computer) which form at least part of a network. A method for estimating the parking occupancy within the area of interest can include the use of vehicle entry and exit data from the area of interest, as well as an estimated transit time for vehicles transiting through the area of interest without parking.

17 Claims, 4 Drawing Sheets

(56) References Cited

OTHER PUBLICATIONS

Bulan et al., "A System and Method for Available Parking Space Estimation for Multispace On-Street Parking", U.S. Appl. No. 13/441,269, filed Apr. 6, 2012.
Bulan et al., "A Video-Based Method for Parking Angle Violation Detection", U.S. Appl. No. 13/461,221, filed May 1, 2012.
Bulan et al., "Video-Based Method for Detecting Parking Boundary Violations", U.S. Appl. No. 13/461,266, filed May 1, 2012.
Bulan et al., "Video-Based System and Method for Detecting Exclusion Zone Infractions", U.S. Appl. No. 13/441,253, filed Apr. 6, 2012.
S. Agarwal et al., "Learning to Detect Objects in Images Via a Sparse, Part-Based Representation", Pattern Analysis and Machine Intelligence, IEEE Transactions, vol. 26, No. 11, Nov. 2004, pp. 1475-1490.
XiaMen, "Video Vehicle Counting System", 1 page http://www.alibaba.com/product-gs/298425877/video_vehicle_counting_system.html, accessed Nov. 21, 2012.
PureActive, Vehicle Counting—Accurate Counting Utilizing Cameras, Pure Tech Systems, Phoenix, AZ, 1 page http://www.puretechsystems.com/docs/Car%20Counting%20Rev%20A.pdf, accessed Nov. 21, 2012.
A. Makarov et al., "Intrusion Detection Using Extraction of Moving Edges", In 12th IAPR Int. Conf. on Pattern Recognition, vol. 1 of IAPR, IEEE Press, 1994, pp. 804-807.
Gonzalo Navarro et al., "Very Fast and Simple Approximate String Matching", Information Processing Letters 72:65-70, 1999, (9 pages).
N. Paragious et al., "Detection and Location of Moving Objects Using Deterministic Relaxation Algorithms", In ICPR, No. 13, Vienna, Austria, Aug. 1996, pp. 201-286.
Selway Capital, News & Transactions, DVTel Wins Project of the Year at IFSEC 2012, May 12, 2010, 1 page http://www.selwaycapital.com/2010/05/12/dvtel-wins-project-ot-the-year-at-ifsec-2010/, accessed Nov. 21, 2012.
Trans-Tech, Redstorm Parking Space Counting System, Transportation Technologies, Inc., Erie, PA, 2 pages http://www.transportation-tech.com/products/parking/redstorm_space_counting_system/page1/, accessed Nov. 21, 2012.
Luo-Wei Tsai et al., "Vehicle Detection Using Normalized Color and Edge Map", Image Processing, IEEE Transactions on Image Processing, vol. 16, No. 3, Mar. 2007, pp. 850-864.
iSense, Video People and Car Counting Embedded Device, Mate Intelligent Video, 1 page http://www.mateusa.net/page.asp?cat=22&type=2&lang=1, accessed Nov. 21, 2012.
R. Baeza-Yates et al., "A Faster Algorithm for Approximate String Matching", In Dan Hirchberg, Gene Myers, Combinatorial Pattern Matching (CPM'96), LNCS 1075, 1996, Irvine, CA, pp. 1-23.

* cited by examiner

SYSTEM AND METHOD FOR ESTIMATION OF AVAILABLE PARKING SPACE THROUGH INTERSECTION TRAFFIC COUNTING

FIELD OF THE EMBODIMENTS

The present teachings relate to the field of vehicle parking and more particularly to methods and structures for determining parking spot availability.

BACKGROUND OF THE EMBODIMENTS

Detecting available on-street parking spaces has been an important problem for parking management companies, city planners, and for others concerned with vehicle densities and parking availability. One method for determining parking availability is through the use of "puck-style" magnetic ground sensors that output a binary signal when detecting a vehicle in a parking stall. While this method can provide accurate parking information for street settings with demarcated parking stalls, it is difficult to estimate parking space when there is no demarcation on the street (multiple parking). In addition, this method offers limited functionality beyond single parking spot counts, is prone to damage by parking vehicles and regular traffic maintenance equipment, and incurs traffic disruption upon installation, repair, and replacement.

Video-based solutions have been also proposed to determine the availability of parking spaces by detecting parking vehicles and then estimating available parking space. Typically, each camera in a network of multiple surveillance cameras can cover four to five parking spots when the camera is deployed at an opposite side of a street relative to the parking spots. These systems can provide accurate parking space estimation for both single space and multi-space parking.

While these systems can provide accurate parking information for each parking spot, there are significant equipment, installation, and maintenance costs associated with these solutions.

SUMMARY OF THE EMBODIMENTS

The following presents a simplified summary in order to provide a basic understanding of some aspects of one or more embodiments of the present teachings. This summary is not an extensive overview, nor is it intended to identify key or critical elements of the present teachings nor to delineate the scope of the disclosure. Rather, its primary purpose is merely to present one or more concepts in simplified form as a prelude to the detailed description presented later.

In an embodiment of the present teachings, a method for estimating parking occupancy within an area of interest can include measuring initialization data for a beginning of a measurement cycle (time t=0), where the initialization data comprises a count of vehicles parked within the area of interest, and a count of vehicles transiting through the area of interest. The method can further include beginning the measurement cycle at time t=0, detecting entry of one or more vehicles into the area of interest using a first image capture device subsequent to t=0, detecting exit of one or more vehicles out of the area of interest using a second image capture device different from the first image capture device subsequent to t=0, and estimating the parking occupancy for the area of interest using the initialization data, the number of vehicles entering the area of interest, and the number of vehicles exiting the area of interest.

In another embodiment of the present teachings, a system can include an interface to a first image capture device configured to detect entry of one or more vehicles into an area of interest over a time interval subsequent to an initial time t=0, an interface to a second image capture device configured to detect exit of one or more vehicles out of the area of interest over the interval, and a processor, communicating with the interface to the first image capture device and the interface to the second image capture device. The processor can be configured to receive initialization data including a count of vehicles located within the area of interest at the initial time t=0 and a count of vehicles transiting through the area of interest at the initial time t=0, and estimate a parking occupancy for the area of interest using the initialization data, the number of vehicles entering the area of interest over the interval, and the number of vehicles exiting the area of interest over the interval.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

Figure 1:
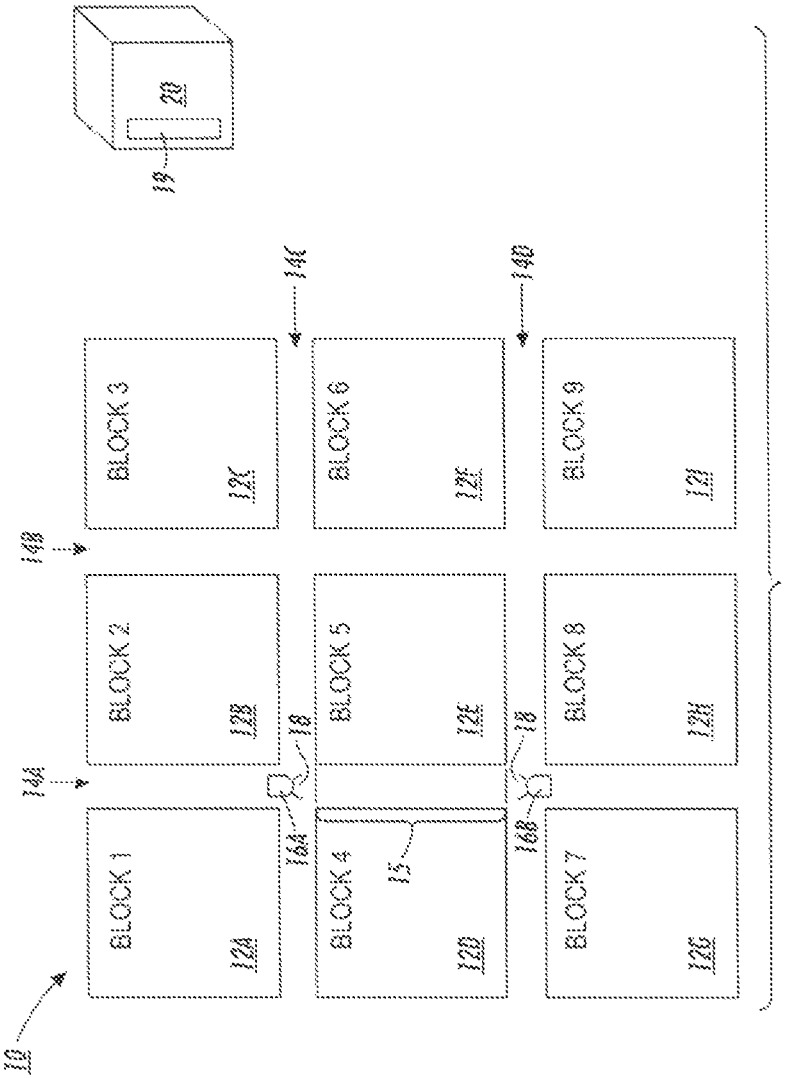
FIG. 1 is a plan view depicting a system in accordance with an embodiment of the present teachings for estimating parking occupancy within an area of interest.

It should be noted that some details of the FIGS. have been simplified and are drawn to facilitate understanding of the present teachings rather than to maintain strict structural accuracy, detail, and scale.

DESCRIPTION OF THE EMBODIMENTS

Reference will now be made in detail to exemplary embodiments of the present teachings, examples of which are illustrated in the accompanying drawings. Wherever possible, the same reference numbers will be used throughout the drawings to refer to the same or like parts.

While puck-style parking detectors and video techniques have a high accuracy in determining parking density and availability, these techniques can require the use of expensive hardware. In many applications, for example dynamic pricing where the cost of parking changes with the overall percentage of occupied spaces, an exact location of each parking spot is not required and a rough estimate of the number of available parking spots may be sufficient.

An embodiment of the present teachings may require fewer cameras and less computational power for available parking space estimation than other parking sensor methods. An embodiment may provide information regarding a percentage of available parking within a given area such as a street block, that is more accurate than, for example, simply subtracting vehicle exits from vehicle entrances at a given instance in time.

Embodiments of the present teachings can include methods and structures for estimating parking occupancy (i.e., parking density). In an embodiment, the occupancy can include a measurement or estimation of a number of parked cars. For example, the number of parked cars can be compared to the number of known parking spaces to determine an occupancy percentage or a percentage of available parking spaces within an area of interest. Some of the present embodiments may have a reduced accuracy compared to some other systems, but an acceptable estimation accuracy may be delivered at a lower cost. The present embodiments can include systems and methods for estimating available parking space on a street block using two or more image capture devices such as high speed still cameras and video cameras. While the description of the present teachings discussed below references video cameras for simplicity, it will be understood that other image capture devices or other vehicle counting devices may be used. A system in accordance with the present teachings can further include one or more of the following: A networked camera system that has at least one camera per each street intersection, including any entrance or exit to the street block such as that from a parking garage, parking lot, alleyway, or driveway; an initial estimate or method for obtaining a count of the number of vehicles parked and a count of the number of vehicles transiting through the area of interest at the beginning of an estimation period (measurement cycle); a vehicle detection method for each camera that will detect vehicles entering and exiting the area of interest; a method to count or generate an identifier for the detected vehicles; and a method to estimate the difference between the number of vehicles that are in transit on the street and number parking on the street, where the parking/transit estimate is performed using the initial estimates and counts or identifiers of the detected vehicles.

FIG. 1 depicts an exemplary embodiment of a system for estimating on-street parking. FIG. 1 is a plan view depicting a portion 10 of a city or other municipality that includes a 3×3 grid of blocks 12, including blocks 12A-12I, with the blocks 12 being separated by streets 14, including streets 14A-14D. In this embodiment a single segment 15 of street 14A between blocks 12D and 12E is of interest and under observation to determine parking occupancy. The parking occupancy estimation system includes two networked video cameras 16A, 16B. Because this embodiment measures a single segment of street, each of the video cameras 16 has a unidirectional field of view 18 (i.e., a viewing angle) that is directed toward the street segment 15 of interest, with each camera 16 being located at opposite ends of the street segment 15 in an intersection. In this embodiment, video camera 16A is located at the intersection of street 14A with street 14C, while video camera 166 is located at the intersection of street 14A with street 14D. The number of video cameras 16 can depend on the number of entrances and exits within the measurement area. The video cameras 16 are networked together, for example using a wired or wireless network connection, to a processor 20 such as a computer or computer system that can include a microprocessor, memory, etc. (not individually depicted for simplicity). The processor 20 can include an interface 19, for example one or more cable jacks such as one or more Ethernet jacks, a wireless receiver, wireless adaptor, etc., to each of the video cameras 16. Other network devices known in the art, such as a wireless repeater, signal amplifier, transmitter, etc., can be used but are not depicted for simplicity.

In an embodiment for estimating parking occupancy in the street segment 15 between blocks 12D and 12E, an initial estimate is obtained of the number of parked vehicles, as well as the number of transiting vehicles (vehicles driving within the block but not parking) on the street segment 15 at the beginning of a measurement cycle. These two data points can be measured or estimated using any number of techniques, such as direct observation by a human operator or using statistical data collected prior to beginning the measurement cycle. This data (i.e., initialization data) is entered into the processor 20 to initialize the network, for example using a hand-held input device by the human operator or by direct entry into the processor 20. This initialization data, as well as other data described below, can be used by the central data processing unit 20 to compute an estimated parking occupancy within the street segment 15 of street 14A using one or more algorithms.

After the initialization, the video cameras monitor and count vehicles entering and exiting the street segment 15 from both ends of the street segment 15. Any method can be used to detect vehicles entering/exiting the street, for example using vehicle detection from still images or video image data from video cameras 16.

Detecting vehicles from still images uses features commonly associated with images of vehicles such as common texture, structure, color, etc. Detection of objects using such data from still images is discussed, for example, in S. Agarwal, A. Awan, and D. Roth, "Learning to detect objects in images via a sparse, part-based representation," IEEE Transactions on Pattern Analysis and Machine Intelligence, vol. 26, no. 11, pp. 1475-1490, 2004, and in Luo-Wei Tsai, Jun-Wei Hsieh, and Kao-Chin Fan, "Vehicle Detection Using Normalized Color and Edge Map", IEEE Trans. on Image Processing, vol. 16, issue. 3, March 2007, pp. 850-864, the disclosures of which are incorporated herein by reference in their entirety.

Detecting vehicles from video data make use of information available in video. In addition to spatial information, these methods typically exploit temporal differences/similarities between the frames for vehicle detection. Detection of objects using such data from video is discussed, for example, in U.S. patent application Ser. No. 13/441,269 filed Apr. 6, 2012; Ser. No. 13,461,266 filed May 1, 2012 to Bulan, et al.; Ser. No. 13,461,266 filed May 1, 2012 to Buten et al., and Ser. No. 13/461,221 filed May 1, 2012 to Bulan et al. each of which is commonly assigned with the current application and incorporated herein by reference in their entirety. Other detection techniques are discussed in A. Makarov, J. Vesin, and M. Kunt "Intrusion Detection Using Extraction of Moving Edges, 12th IAPR Int. Conf. on Pattern. Recognition, V1, IAPR, pages 804-807, IEEE Press, 1994 and N. Paragious and G. Tziritas, "Detection and Location of Moving Objects Using Deterministic Relaxation Algorithms, ICPR, No. 13, pp. 201-286, Vienna, Austria, August 1996, the disclosures of which are incorporated herein by reference in their entirety.

In an embodiment, vehicles can be detected by constructing a background estimate and subtracting the constructed background from a given frame. The method first initializes the background as the first frame and gradually updates the background as new frames become available. The background is updated with a new frame as:

$$B_{t+1}=p*F_{t+1}+(1-p)*B_t$$

where $B_t$ is the background at time t, $F_{t+1}$ is the frame at time t+1, p is $0\leq p\leq 1$, and p is an image updating factor, and * is the operator for element-wise multiplication. If p is set to 1 for all pixels, then the estimated background at any given time is equal to the current frame. Conversely, if p is set to 0, the background remains the same as the background at time t. In other words, p controls the updating rate of the background.

The type of application determines the specific choices for different values of p. In particular, the proposed selection method for the learning factor p is well suited for detecting vehicles. The following criteria can be defined to set the learning parameter for each pixel at each time instant:

$$p(i, j) = \begin{cases} 0 & \text{if foreground is detected} \\ ps & \text{otherwise} \end{cases}$$

The learning parameter p for a pixel indexed or addressed by (i,j) can be set to 0 if foreground is detected at that pixel location. Under these conditions, background pixels are not updated for these locations. For all other pixels, the learning parameter is set to ps, which is a small positive number to update the background gradually.

Once the background is estimated at a given time, the vehicles that are entering/exiting the street can be detected by subtracting the current frame from the estimated background and applying thresholding and morphological operations on the difference image.

Optionally, when a vehicle is detected using the background subtraction algorithm detailed above, the detected vehicle (i.e., "blob") can be verified through a validation module. The validation module can extract image features, for example a histogram of gradients (HOG), scale invariant feature transform (SIFT), edges, aspect ratio, etc. and verifies the detected blob using the extracted features and a classifier, for example linear/nonlinear support vector machine (SVM), nearest neighbor classifier, etc., which is trained offline. This ensures that the detected object is a vehicle and not another object, for example a moving object such as a pedestrian, bicyclist, etc.

In an embodiment of a method for estimating parking occupancy, for example in street segment 15, a method to count each vehicle entering and exiting street segment 15 and an estimate of the number of vehicles transiting through street segment 15 can be generated and stored in the processor 20. In one estimation method, a count-based method determines current traffic flow and generates a timeline of vehicle counts as vehicles enter and exit street segment 15 from either direction. As a vehicle enters street segment 15, a video camera 16 detects the vehicle and sends information relative to the specific individual vehicle to the processor 20, which the processor 20 uses to associate with each vehicle. For example, the processor may process the information into feature vectors to determine that a vehicle is a "red sedan," "blue pickup," "white van," etc. Feature vectors can include, for example, vehicle color, vehicle type (i.e., sedan, coup, convertible, etc.), vehicle size (i.e., car, van, SUV, delivery truck, etc), or a combination of two or more feature vectors. Vehicles entering the street segment 15 can be tracked with an "entry" variable (e.g., "$C^+(t)$") and, upon detection, the count of the entry variable is increased by one. As a previously detected vehicle exits the street segment, a video camera 16 detects the exiting vehicle and sends the exit information relative to the specific vehicle to the processor 20, and an "exit" variable (e.g., "$C^-(t)$") is increased by one. The processor 20 can then estimate the number of vehicles within the street segment 15 by subtracting $C^-(t)$ from $C^+(t)$.

In addition, to improve accuracy so that transiting vehicles are not counted as parked vehicles, a typical vehicle transit time through the street segment 15 for vehicles proceeding directly from its entry point to its exit point (i.e., vehicles using the street segment 15 but not parking). The typical transit time can be denoted as "Δt," and Δt may include an adder for tolerance. For example, for a 200 foot long section of street, an average Δt may be about 6.8 seconds assuming an average speed of about 20 mph for through traffic. As a vehicle enters street segment 15, its count is added to variable $C^+(t)$, and it is given time Δt to exit street segment 15. If the specific vehicle is not detected as exiting as a function of its entry time plus Δt, it is counted as a parked vehicle and the estimated parking occupancy for street segment 15 is increased accordingly. If an exiting vehicle is detected that has a transit time that exceeds Δt, the vehicle is assumed to be a previously parked vehicle that has exited street segment 15, the exit count $C^-(t)$ is increased by one, and the estimated parking occupancy is decreased accordingly. This is in contrast to some conventional parking estimation techniques and structures that simply subtract the number of exits from the number of entrances to determine a parking occupancy, and may assume all vehicles that enter are parked. This conventional technique may work for parking garages and lots, but would be inaccurate for street parking or parking areas having through traffic. Thus embodiments of the present teachings may provide a more accurate parking occupancy estimate.

The transit time Δt can be determined using various techniques. For example, a human operator can periodically measure the transit time for a specific vehicle as it transits through the street segment 15 and the measured value can be entered into the processor 20 using direct input or input from a handheld device and subsequently used as Δt. In another technique, the processor 20 can use historical data, for example a measured Δt from previous same days of the week. In another technique, the processor 20 in cooperation with the video cameras 16 keeps a live running value for Δt based on vehicles entering street segment 15 and exiting within Δt±a tolerance value, and then adjusting Δt based on the measured transit time. Further, Δt may change during the day based on the time of day, the day of the week, and/or the time of year, and may therefore be adjusted for diurnal, weekly, monthly, or yearly traffic patterns. For example, Δt may be shorter during early mornings and late evenings, and longer during rush hour traffic. Diurnal adjustments to Δt and historical norms for Δt can be programmed into the processor 20 for automated updating.

Traffic flow can also be described using the feature vectors described above, but using a different estimating method. In this case a vehicle sequence estimation technique. In this embodiment, in a given sequence time interval $\Delta S_T$, (an arbitrary user-selected sequence time interval over which vehicle entry and exit sequence is monitored) a sequence of detected vehicles entering the street might be, for example, "red sedan," "blue pickup," "blue sedan." Within the sequence time interval $\Delta S_T$, the sequence of exiting vehicles detected is "red sedan," "blue sedan." In this embodiment, the blue pickup can counted as a parked vehicle if it is not detected exiting with its entry time plus Δt.

Similarly, if a sequence of vehicles entering the street segment 15 is determined to be "red sedan," "blue sedan" and within sequence time interval $\Delta S_T$ a sequence of detected exiting vehicles is "red sedan," "black van," "blue sedan," the black van can be counted as a parked vehicle which has exited a parking spot and the street segment 15. The count of the formerly parked black van can be added to the number of vehicles absent from the entry sequence and present in the exit sequence during the sequence time interval $\Delta S_T$ and the estimated parking occupancy can be decreased accordingly.

$$C_P(t)=C_P(t-\Delta S_T)+\Delta C^+-\Delta C^-$$

where $C_P(t)$ is an estimated parking occupancy at a time t during the sequence time interval $\Delta S_T$ where time t is subsequent to the initial time t=0, $C_P(t-\Delta S_T)$ is an estimated parking occupancy at a time $t-\Delta S_T$, $\Delta C^+$ is a number of vehicles present in the entry sequence and absent from the exit sequence when the entering and exiting sequences are compared, $\Delta C^-$ is a number of vehicles absent from the entry sequence and present in the exit sequence when the entering and the exiting sequences are compared.

In another method according to the present teachings, the parking occupancy or transit occupancy can be estimated by a count-based method using mathematical techniques. In this embodiment, vector features for specific vehicles are not necessary and a mathematical algorithm is used to estimate parking occupancy at a given time "t" that is after measurement begins at t=0. For example, an estimated parking occupancy or occupancy can be calculated using the formula:

$$C_P(t)=C_{P0}+C^+(t-\Delta t)-[C^-(t)-C_{T0}]$$

where $C_P(t)$ is the estimated parking occupancy at a given time t during the measurement cycle where time t is subsequent to time t=0, $C_{P0}$ is an initialization data count of vehicles parked within the area of interest at the beginning of a measurement cycle (t=0) as discussed above, $C^+(t-\Delta t)$ is a count of the number of vehicles entering the street segment 15 from time t=0 up to time $t-\Delta t$ where $\Delta t$ is the estimated transit time for a vehicle from the start of the interest area to the end of the interest area, and $t-\Delta t$ is greater than t=0, $C^-(t)$ is the count of the number of vehicles exiting the street segment 15 from time t=0 up to the time t, and $C_{T0}$ is an initial count of transiting vehicles within the street segment 15 at the beginning of a measurement cycle (t=0). $C_{T0}$ can be determined for the beginning of the measurement cycle (t=0) by a manual count of the transiting vehicles by a human operator or using another technique. Thus both $C_{P0}$ and $C_{T0}$ are initialization data entered into the processor 20, for example directly or through a hand-held device by a human operator, for the beginning the measurement cycle (t=0).

Figure 2:
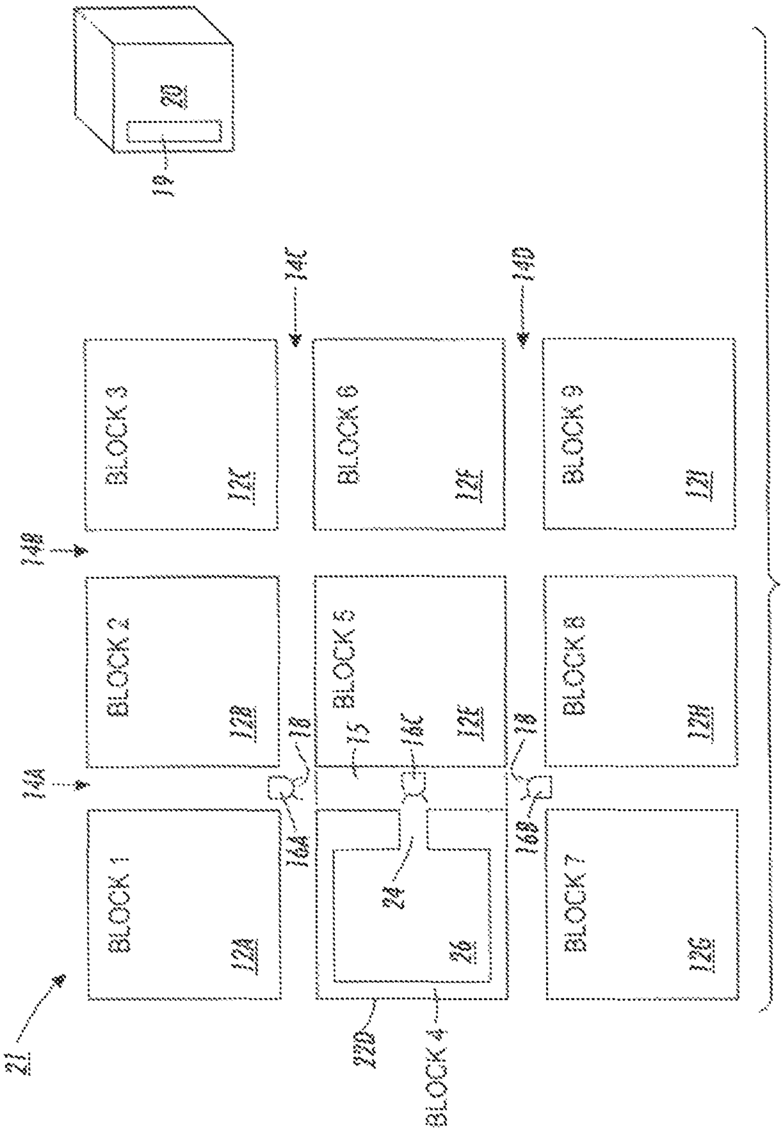
FIG. 2 is a plan view depicting a system in accordance with another embodiment of the present teachings for estimating parking occupancy within an area of interest.

FIG. 2 depicts another embodiment of the present teachings in which a portion 21 of a city or other municipality includes a block 22D having a midblock access point 24 for entry and/or exit to an alleyway, driveway, parking lot entry, etc. 26. This embodiment includes a third video camera 16C to track vehicles entering and/or exiting through access point 24. Generally, the number of video cameras 16 used can equal the number of entry and/or exit points for the street segment 15 under observation. Data from this third video camera 16C can be used to estimate the parking occupancy on the street segment 15. For example, when a vehicle enters street segment 15 from a street intersection the entry variable $C^+(t)$ is increased by one and, when the vehicle exits either at the opposite intersection or through access point 24, exit variable $C^-(t)$ is increased by one. Similarly, when a vehicle enters street segment 15 from access point 24 the entry variable $C^+(t)$ is increased by one and, when the vehicle exits street segment 15 the exit variable $C^-(t)$ is increased by one. A vehicle that enters street segment 15 at any point and does not exit the street segment within $\Delta t$ (i.e., at the entry time plus $\Delta t$ is assumed to be a parked vehicle and the parking occupancy estimate is adjusted accordingly. The data from the video cameras can be uploaded to the processor 20 where data analysis is performed and a parking occupancy estimation is calculated.

Figure 3:
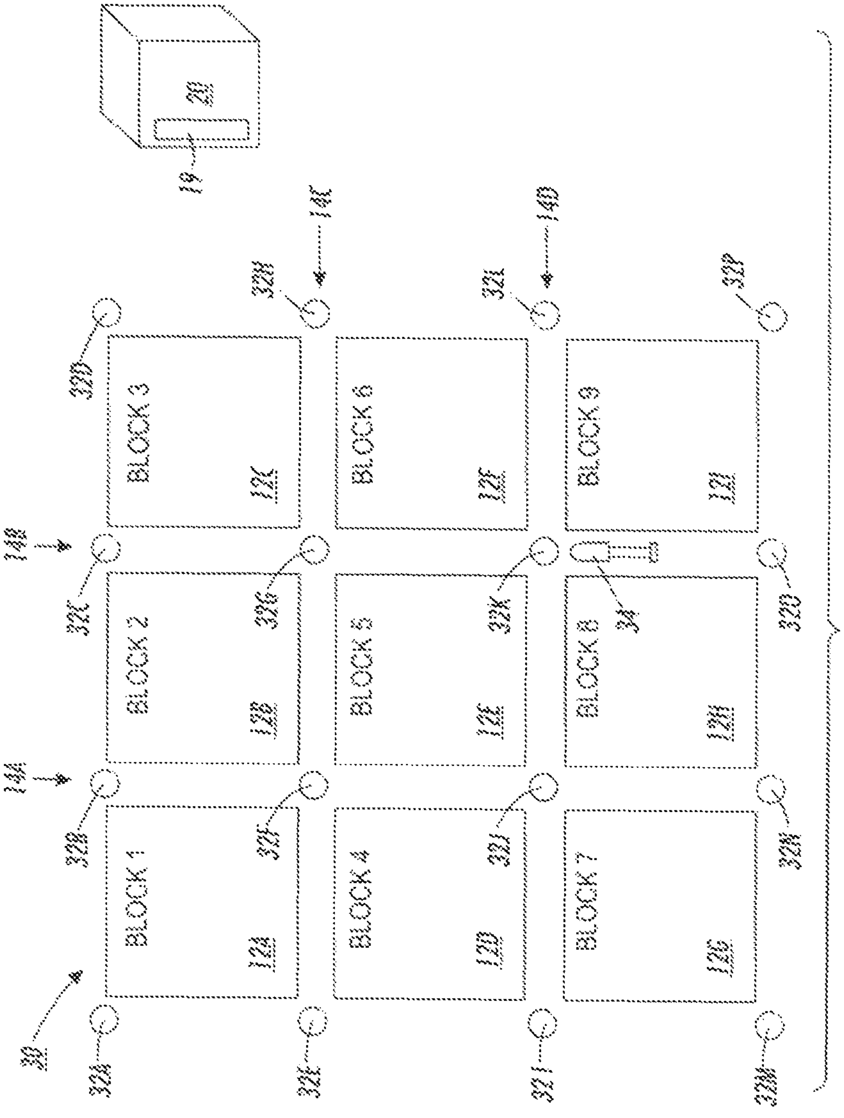
FIG. 3 is a plan view depicting a system in accordance with another embodiment of the present teachings for estimating parking occupancy within an area of interest.

In another embodiment as depicted in FIG. 3, a system for estimating a parking occupancy includes network of multidirectional video cameras 32A-32P. This is in contrast to the unidirectional video cameras 16 of the embodiments discussed above. In this embodiment, the video cameras can include a 360° viewing angle so that multiple street segments can be monitored and data from multiple street segments can be sent to processor 20 where data analysis is performed and a parking occupancy estimation over a wide area can be calculated. In this embodiment, one video camera 32 is placed at each intersection. Additionally, if a block includes an access point 24 (FIG. 2), each access point 24 can include a video camera, for example a unidirectional video camera 16 or a multidirectional video camera 32.

Once a parking occupancy estimate has been generated, any number of operations can be performed. For example, the parking occupancy estimate can be made available for public or private viewing. The parking occupancy estimate can be configured for public or private viewing, for example using the processor 20 to broadcast the parking occupancy data or uploading the parking occupancy data from the processor 20 to a network such as the Internet. A user can access the parking occupancy estimate through a processor or computing device such as a laptop, smartphone, tablet, handheld device, GPS navigation system, etc., and use the data to determine the likelihood of finding available parking.

It is also contemplated that a parking management entity can set dynamic parking rates based on parking occupancy. For example, a parking rate charged by the parking management entity during periods of low parking space availability (high parking occupancy) may be higher than during periods of high parking space availability (low occupancy parking). The dynamic parking rates can be configured for public or private viewing such that a user can determine current parking rates almost instantaneously. Dynamic parking rates can be configured for public or private viewing, for example using the processor 20, to broadcast dynamic parking rates or uploading the dynamic parking rates from the processor 20 to a network such as the internet. A user can access the dynamic parking rate through a processor or computing device such as a laptop, smartphone, tablet, handheld device, GPS navigation system, etc., and select parking based on the current dynamic parking rate.

Additionally, it is contemplated that parking payment devices 34 (FIG. 3) such as parking meters, credit/debit payment centers, radio frequency identification (RFID) payment devices, or other parking payment devices can be networked into the processor 20. The processor 20 can use the estimated parking occupancy to set dynamic parking rates for the area of interest, for example based on a lookup table. The dynamic rates may or may not be downloaded or transmitted to, and displayed on, the parking payment device 34. If used, a user-viewable display on the parking payment device 34 can be mechanical or electronic display that can be dynamically updated with current parking rates, for example an LED display, an LCD display, or a mechanical display that can be dynamically updated based on current parking occupancy. A parking management entity can thereby control parking and vehicle traffic within a given area by setting and charging customers dynamic parking rates.

Figure 4:
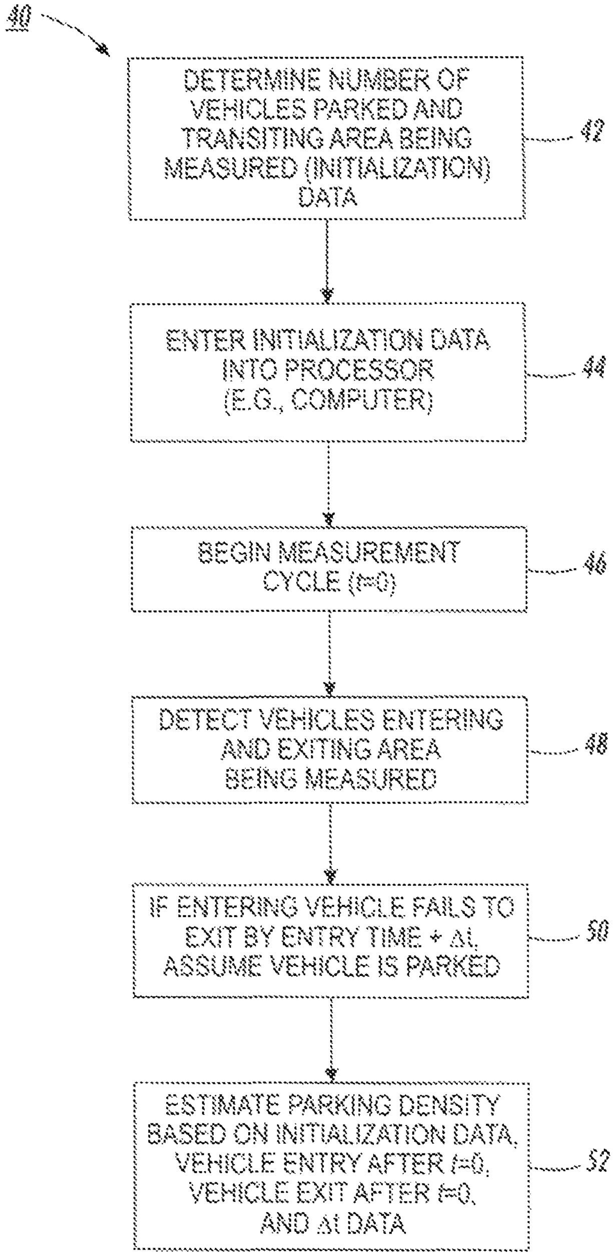
FIG. 4 is a flow chart depicting a method in accordance with an embodiment of a present teachings for estimating parking occupancy within an area of interest.

FIG. 4 is a flow chart depicting various stages that can be used in a method 40 for estimating parking occupancy in accordance with an embodiment of the present teachings. In an embodiment, a first stage 42 includes determining the number of vehicles parked within the area being measured (i.e., area of interest), as well as the number of vehicles transiting the area being measured. This initialization data can either be estimated or accurately measured. The initialization data can be gathered either by a human operator or through automated techniques. This data is entered into the processor 20 (FIGS. 1-3) and a measurement cycle is begun. The vehicles entering and exiting the area of interest are detected 48, for example using video cameras 16, 32 (FIGS. 1-3) connected to, and in cooperation with, the processor 20. The connection between the video cameras and the processor can be a direct connection, such as through one or more data cables or through wireless communication, or through an indirect connection, for example through an intermediate network such as the Internet. If an entering vehicle fails to exit the area of interest within a specific time Δt, the vehicle is assumed to have parked 50. Parking occupancy is then estimated by the processor 20 using the vehicle entry, exit, and Δt data 52, for example using the techniques described above. The parking occupancy can thus be dynamically and constantly updated Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as less than 10 can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all method stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of workplace, regardless of the orientation of the workplace. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A method for estimating parking occupancy within an area of interest, comprising:

measuring initialization data for a beginning of a measurement cycle (time t=0), where the initialization data comprises:

a count of vehicles parked within the area of interest; and a count of vehicles transiting through the area of interest;

beginning the measurement cycle at time t=0;

detecting entry of one or more vehicles into the area of interest using a first image capture device subsequent to t=0;

detecting exit of one or more vehicles out of the area of interest using a second image capture device different from the first image capture device subsequent to t=0; and estimating the parking occupancy for the area of interest at a time t using the initialization data, the number of vehicles entering the area of interest only from a time t=0 to a time t−Δt, Δt being an estimated transit time for any vehicle from the start of the area of interest to an end of the area of interest, and the number of vehicles exiting the area of interest, wherein:

the area of interest comprises a street segment of a first street;

the street segment is located between a first intersection and a second intersection;

the first intersection is an intersection of the first street and a second street;

the second intersection is an intersection of the first street and a third street; and the count of vehicles transiting through the area of interest comprises a count of vehicles transiting the street segment between the first intersection and the second intersection without parking.

2. The method of claim 1, further comprising:

determining the time "Δt" for a vehicle to travel directly through the area of interest from entry into the area of interest to exit from the area of interest; and estimating the parking occupancy for the area of interest according to a formula:

$$C_P(t)=C_{P0}=C^{+}(t-\Delta t)-[C^{-}(t)-C_{T0}]$$

where $C_p(t)$ is an estimated parking occupancy at the time t during the parking occupancy measurement cycle where time t is subsequent to time t=0, $C_{PO}$ is the initialization data count of vehicles parked within the area of interest at time t=0, $C^+(t-\Delta t)$ is a count of vehicles entering the area of interest during the measurement cycle from the time t=0 up to a time t−Δt where t−Δt is greater than t=0, $C^+(t-\Delta t)$ is a count of the number of vehicles exiting the area of interest from the time t=0 up to the time t, and $C_{TO}$is the initialization data count of vehicles transiting through the area of interest at time t=0.

3. The method of claim 1, further comprising:

detecting a plurality of vehicles entering the area of interest using the first image capture device;

associating at least one vehicle feature vector with each vehicle of the plurality of vehicles detected as entering the area of interest by the first image capture device;

forming an entry sequence for the plurality of vehicles detected as entering the area of interest, where the entry sequence is based on at least one vehicle feature vector associated with each vehicle of the plurality of vehicles;

detecting at least one vehicle exiting the area of interest using the second image capture device;

associating at least one vehicle feature vector with the at least one vehicle detected as exiting the area of interest by the second image capture device;

identifying the at least one vehicle detected as exiting the area of interest as at least one of the plurality of vehicles detected as entering the area of interest;

forming an exit sequence for the at least one vehicle of the plurality of vehicles that exit the area of interest during a sequence time interval $\Delta S_T$; and estimating the parking occupancy for the area of interest by comparing the entry sequence with the exit sequence according to a formula:

$$C_P(t)=C_P(t-\Delta S_T)+\Delta C^+-\Delta C^-$$

where $C_P(t)$ is an estimated parking occupancy at time t during the parking occupancy measurement cycle where time t is subsequent to time t=0, $C_P(t-\Delta S_T)$ is an estimated parking occupancy at a time $t-\Delta S_T$, $\Delta C^+$ is a number of vehicles present in the entry sequence and absent from the exit sequence when the entering and the exiting sequences are compared, $\Delta C^-$ is a number of vehicles absent from the entry sequence and present in the exit sequence when the entering and the exiting sequences are compared.

4. The method of claim 3, the exiting sequence is compared to the entering sequence by time delay $\Delta t$, where $\Delta t$ is the time for a vehicle to travel directly through the area of interest from entry into the area of interest to exit from the area of interest.

5. The method of claim 1, further comprising setting a dynamic parking rate for the area of interest based on the estimated parking occupancy within the area of interest at time t where time t is subsequent to time t=0.

6. The method of claim 5, further comprising configuring the dynamic parking rate for viewing using a method selected from the group consisting of broadcasting the dynamic parking rate and uploading the dynamic parking rate to a network.

7. The method of claim 5, comprising:

networking the first image capture device, the second image capture device, at least one parking payment device, and a processor; and downloading the dynamic parking rate from the processor to the at least one parking payment device.

8. The method of claim 5, further comprising displaying the dynamic parking rate on the parking payment device.

9. The method of claim 1, further comprising configuring the estimated parking occupancy for viewing using a method selected from the group consisting of broadcasting the estimated parking occupancy and uploading the estimated parking occupancy to a network.

10. A system, comprising:

an interface to a first image capture device configured to detect entry of one or more vehicles into an area of interest over a time interval subsequent to an initial time t=0;

an interface to a second image capture device configured to detect exit of one or more vehicles out of the area of interest over the interval; and a processor, communicating with the interface to the first image capture device and the interface to the second image capture device, the processor being configured to:

receive initialization data including a count of vehicles located within the area of interest at the initial time t=0 and a count of vehicles transiting through the area of interest at the initial time t=0; and estimate a parking occupancy for the area of interest at a time t using the initialization data, the number of vehicles entering the area of interest only from a time t=0 to a time $t-\Delta t$, $\Delta t$ being an estimated transit time for a vehicle to travel directly through the area of interest from entry into the area of interest to exit from the area of interest, and the number of vehicles exiting the area of interest over the interval, wherein:

the area of interest comprises a street segment of a first street;

the street segment is located between a first intersection and a second intersection;

the first intersection is an intersection of the first street and a second street;

the second intersection is an intersection of the first street and a third street; and the count of vehicles transiting through the area of interest comprises a count of vehicles transiting the street segment between the first intersection and the second intersection without parking.

11. The system of claim 10, wherein the processor is further configured to:

estimate the parking occupancy for the area of interest according to a formula:

$$C_P(t)=C_{P0}+C^+(t-\Delta t)-[C^-(t)-C_{T0}]$$

where $C_P(t)$ is an estimated parking occupancy at time t during the time interval where time t is subsequent to the initial time t=0, $C_{P0}$ is the initialization data count of vehicles parked within the area of interest at time t=0, "$\Delta t$" is the time for a vehicle to travel directly through the area of interest from entry into the area of interest to exit from the area of interest, $C^+(t-\Delta t)$ is a count of vehicles entering the area of interest during the time interval from the initial time t=0 up to a time $t-\Delta t$ where $t-\Delta t$ is subsequent to the initial time t=0, $C^-(t)$ is a count of the number of vehicles exiting the area of interest from the initial time t=0 up to the time t, and $C_{T0}$ is the initialization data count of vehicles transiting through the area of interest at the initial time t=0.

12. The system of claim 10, further comprising:

the interface to the first image capture device is further configured to detect a plurality of vehicles entering the area of interest in an entry sequence, where the entry sequence comprises a plurality of feature vectors with at least one feature vector associated with each vehicle;

the interface to the second image capture device is further configured to detect at least one vehicle exiting the area of interest, where at least one feature vector is associated with the at least one vehicle exiting the area of interest;

the processor is further configured to;

identify the at least one vehicle detected as exiting the area f interest as at least one of the plurality of vehicles detected as entering the area of interest using the at least one feature vector;

formulate an exit sequence for the at least one vehicle of the plurality of vehicles that exit the area of interest during a sequence time interval $\Delta S_T$; and estimate the parking occupancy for the area of interest by comparing the entry sequence with the exit sequence according to a formula:

$$C_P(t)=C_P(t-\Delta S_T)+\Delta C^+-\Delta C^-$$

where $C_P(t)$ is an estimated parking, occupancy at time t during the sequence time interval $\Delta S_T$ where time t is subsequent to the initial time t=0, $C_P(t-\Delta S_T)$ is an estimated parking occupancy at a time $t-\Delta S_T$, $\Delta C^+$ is a number of vehicles present in the entry sequence and absent f m the exit sequence during the sequence time interval $\Delta S_T$, $\Delta C^-$ is a number of vehicles absent from the entry sequence and present in the exit sequence during the sequence time interval $\Delta S_T$.

13. The system of claim 10, wherein the processor is configured to set a dynamic parking rate for the area of interest based on the estimated parking occupancy within the area of interest at time t where time t is subsequent to initial time t=0.

14. The system of claim 13, wherein the processor is operable to configure the dynamic parking rate for viewing using a method selected from the group consisting of broadcasting the dynamic parking rate and uploading the dynamic parking rate to a network.

15. The system of claim 13, further comprising:

at least one parking payment device networked with the processor; and the dynamic parking rate is downloaded from the processor to the at least one parking payment device.

16. The system of claim 15, wherein the dynamic parking rate is displayed on the parking payment device.

17. The system of claim 10, wherein the estimated parking occupancy is configured for viewing using a method selected from the group consisting of broadcasting the estimated parking occupancy and uploading the estimated parking occupancy to a network.

* * * * *